US007840755B2

(12) United States Patent
Qi et al.

(10) Patent No.: US 7,840,755 B2
(45) Date of Patent: Nov. 23, 2010

(54) METHODS AND SYSTEMS FOR AUTOMATICALLY IDENTIFYING A MODIFICATION TO A STORAGE ARRAY

(75) Inventors: Yanling Qi, Austin, TX (US); Robert Stankey, Wichita, KS (US)

(73) Assignee: LSI Corporation, Milpitas, CA (US)

( * ) Notice: Subject to any disclaimer, the term of this patent is extended or adjusted under 35 U.S.C. 154(b) by 645 days.

(21) Appl. No.: 11/136,741

(22) Filed: May 24, 2005

(65) Prior Publication Data

US 2006/0271608 A1      Nov. 30, 2006

(51) Int. Cl.
 *G06F 12/06* (2006.01)
(52) U.S. Cl. ............... 711/114; 711/156; 711/E12.078
(58) Field of Classification Search .......... 711/114
See application file for complete search history.

(56) References Cited

U.S. PATENT DOCUMENTS

| 5,398,253 | A | 3/1995 | Gordon ................. 371/40.4 |
| 5,689,678 | A | 11/1997 | Stallmo et al. ............. 395/441 |
| 6,289,398 | B1 | 9/2001 | Stallmo et al. ............... 710/5 |
| 6,343,324 | B1 * | 1/2002 | Hubis et al. ................ 709/229 |
| 6,564,295 | B2 | 5/2003 | Okabayashi et al. ........ 711/114 |
| 6,807,605 | B2 | 10/2004 | Umberger et al. .......... 711/114 |
| 6,851,037 | B2 | 2/2005 | Watkins et al. ............. 711/202 |
| 6,871,317 | B1 | 3/2005 | Corbett .................... 714/800 |
| 2003/0217234 | A1 * | 11/2003 | Rowlands ................. 711/141 |
| 2003/0221060 | A1 | 11/2003 | Umberger et al. .......... 711/114 |
| 2004/0044850 | A1 * | 3/2004 | George et al. ............. 711/131 |
| 2004/0064594 | A1 * | 4/2004 | Pooni et al. ................. 710/1 |
| 2004/0068609 | A1 | 4/2004 | Umberger et al. .......... 711/114 |
| 2004/0068610 | A1 | 4/2004 | Umberger et al. .......... 711/114 |
| 2004/0193827 | A1 * | 9/2004 | Mogi et al. ............... 711/170 |
| 2005/0018672 | A1 * | 1/2005 | Dropps et al. ............. 370/389 |
| 2006/0074918 | A1 * | 4/2006 | Nakatsuka et al. .......... 707/10 |
| 2006/0236033 | A1 * | 10/2006 | Guinn et al. ............... 711/118 |

* cited by examiner

*Primary Examiner*—Matt Kim
*Assistant Examiner*—Ryan Dare
(74) *Attorney, Agent, or Firm*—Kermit D. Lopez; Luis M. Ortiz; Ortiz & Lopez, PLLC

(57) ABSTRACT

Methods and systems for automatically identifying storage array modifications thereof. An interface device associated with a data-processing system and a storage array thereof can be automatically monitored in order to identify one or more command completion events associated with the interface device. Data indicative of the status of the interface device can then be automatically compiled in response to identifying the command completion even(s) as a result of automatically monitoring the interface device. Data indicating that the storage array has been modified can thereafter be generated if the data indicative of a status of the interface device is equivalent to a particular value.

20 Claims, 5 Drawing Sheets

METHODS AND SYSTEMS FOR AUTOMATICALLY IDENTIFYING A MODIFICATION TO A STORAGE ARRAY

TECHNICAL FIELD

Embodiments are generally related to storage arrays and computer networks. Embodiments are also related to logical units (LUNS) associated with storage arrays.

BACKGROUND OF THE INVENTION

A storage array finds usefulness in any number of modern data-processing applications. One example where a storage array is often applied is in the context of a file server, which is a data-processing system that provides file service relating to the organization of information on writeable persistent storage devices, such as memories, tapes or disks of an array. The file server or filer may be embodied as a storage system including an operating system that implements a file system to logically organize the information as a hierarchical structure of directories and files on, e.g., the disks. Each "on-disk" file may be implemented as set of data structures, e.g., disk blocks, configured to store information, such as the actual data for the file. A directory associated with the storage array, on the other hand, may be implemented as a specially formatted file in which information about other files and directories are stored.

A storage system for a storage array may be further configured to operate according to a client/server model of information delivery to thereby allow many clients to access files stored on a server, e.g., the storage system. In this model, the client may comprise an application executing on a computer that "connects" to the storage system over a computer network, such as a point-to-point link, shared local area network, wide area network or virtual private network implemented over a public network, such as the Internet. Each client may request the services of the file system on the storage system by issuing file system protocol messages (in the form of packets) to the system over the network. It should be noted, however, that the storage system may alternatively be configured to operate as an assembly of storage devices that is directly attached to a (e.g., client or "host") computer. Here, a user may request the services of the file system to access (i.e., read and/or write) data from/to the storage devices.

A common type of file system is a "write in-place" file system in which the locations of the data structures, such as data blocks, on disk are typically fixed. Changes to the data blocks are made "in-place" in accordance with the write in-place file system. If an update to a file extends the quantity of data for the file, an additional data block is allocated.

Another type of file system is a write-anywhere file system that does not overwrite data on disks. If a data block on disk is retrieved (read) from disk into memory and "dirtied" with new data, the data block is stored (written) to a new location on disk to thereby optimize write performance. A write-anywhere file system may initially assume an optimal layout such that the data is substantially contiguously arranged on disks. The optimal disk layout results in efficient access operations, particularly for sequential read operations, directed to the disks.

The disk storage is typically implemented as one or more storage "volumes" that comprise a cluster of physical storage devices (disks), defining an overall logical arrangement of disk space. Each volume is generally associated with its own file system. The disks within a volume/file system are typically organized as one or more groups of Redundant Array of Independent (or Inexpensive) Disks (RAID). RAID implementations enhance the reliability/integrity of data storage through the redundant writing of data "stripes" across a given number of physical disks in the RAID group, and the appropriate storing of redundant information with respect to the striped data. The redundant information enables recovery of data lost when a storage device fails.

In modern cooperation data centers, storage array systems are widely used to provide data storage for mission critical data. Enterprise servers usually access data storage provided by storage array subsystems through a Storage Area Network (SAN). An example of an SAN is depicted in FIG. 1, which illustrates a block diagram indicative of a storage area network system 100. In the configuration depicted in FIG. 1, system 100 includes a group of servers 102, 104, and 106, which communicate with and are connected to an SAN 104. Additionally, a group of disk arrays 108, 110 are also connected to and communicate with SAN 104.

In general, modern intelligent storage array controllers provide more advanced features beyond RAID data availability protection and IO performance improvement. Some of these advanced features include the ability to dynamically create a logical volume and make the volume available to enterprise servers on the SAN. When a storage administrator decides that more storage are needed for his/her server applications, the storage array can provide additional logical volume and make it available to server applications without interrupting server's normal services. Other advanced features include creating a snapshot image volume of an existing volume and make it available to enterprise servers on the SAN. A snapshot volume is a "single point-in-time image" of a volume. Data center uses snapshot volumes for short-term backup or "working copy" of regular data.

Further advanced features include the ability to delete a snapshot image volume and create a new snapshot volume and make it available to enterprise servers on the SAN. Data center creates a new snapshot of an existing volume and discards the old snapshot. Another advanced feature involves creating a copy volume of an existing volume and making it available to enterprise servers on the SAN. Data center clones a set of data as a backup or splitting the current data to two different branches.

Organization and companies that utilize computer systems often out source the bulk storage of data from such systems to a storage service provider. These organizations obtain the benefit that they do not need to invest capital in large arrays of hard discs or to employ highly paid specialists to manage such storage arrays.

The storage service providers often utilize large arrays of hard discs. The providers partition the total storage capacity of the hard disc arrays into a number of areas, known as Logical Units (LUNs), with a LUN being a particular disc, plurality of discs or part of a particular disc. Thus each LUN has a defined physical location within the disc array, and is in general a contiguous area of the array.

When a host rents a certain volume of storage capacity the relevant number of LUNs is assigned to that host, and the host may aggregate them into volumes. It is rare for a LUN to be used to its full capacity to store host information. However, once the size of a LUN is defined at the outset it is difficult to redefine it to a larger capacity without removal and reinsertion of all the data, so increasing the size of a LUN is generally avoided by allocating enough storage capacity at the outset to exceed predicted maximum usage requirements. Also, information technology (IT) managers tend to avoid full volumes because this can cause additional problems. The net result may be a significant amount of disc space, which is allocated to particular hosts, on one or more of the discs in the service provider's disc array remaining unused by the respective hosts and inaccessible to other hosts.

In general, all the above advanced storage array features rely on a server operating system to discover LUN creation on a storage array system and make the LUN available to server applications. In the case of a snapshot volume deletion/re-creation, if the old snapshot volume and the new snapshot volume are mapped to the same addressable address, the host operating must understand the volumes on the same addressable address are two different volumes.

Some operating systems such as Microsoft windows support hardware "Plug and Play" or PnP. The hardware PnP feature is limited to the case where a new hardware is plugged into or removed from the system. In the case of SAN environment, however, when a fibre channel (FC) cable, which is connected to a FC switch, is plugged to a FC HBA port that is installed on a computer system, the HBA will discover all storage arrays that are connected on the switch and then notify the operating system that new devices are plugged in. All available Logical Units behind a storage system are further discovered and become available to the operation system.

When a FC port of a storage array is plugged into a FC switch, the switch detects a new FC port joins the fabric. It will send a notification event to all parties in the fabric. A host HBA will receive the event and detect the newly joined member. The HBA driver will notify the operation system that a new-storage array and devices are available.

When a new Logical Unit is created in an existing storage array, the operating system and the host HBA doesn't realize the logical unit inventory changes in the storage array system. The new Logical Unit is not reported to the operating system and further it is not available to server applications. One of the problems with conventional methodologies with respect to LUNs and storage array systems is that after a new logical unit is created, data center administrator has to manually start a "device rescan" procedure to force the operating system re-scan its bus device. Such procedures are time consuming and generally ineffective.

Based on the foregoing, it is believed that a solution to such problems is to implement a method and/or system that automatically discovers Logical Unit creation and deletion from a storage array system and makes the new Logical Unit available for server applications. Such methods and systems are disclosed in greater detail herein.

BRIEF SUMMARY

The following summary of the invention is provided to facilitate an understanding of some of the innovative features unique to the present invention and is not intended to be a full description. A full appreciation of the various aspects of the invention can be gained by taking the entire specification, claims, drawings and abstract as a whole.

It is therefore one aspect of the present invention to provide for improved data-processing methods and systems.

It is another aspect of the present invention to provide for improved storage array methods and systems.

It is a further aspect of the present invention to provide for a method and system for automatically identifying the generation of a logical unit and the deletion of storage array subsystem in the context of host operating systems.

It is yet another aspect of the present invention to provide for methods and systems for automatically discovering LUN creation and deletion from a storage array system and permitting new LUNs to be available for server applications.

The above and other aspects of the invention can be achieved as will now be briefly described. Methods and systems for automatically identifying storage array modifications thereof are disclosed. In general, an interface device (e.g., SCSI) associated with a data-processing system and a storage array thereof can be automatically monitored in order to identify one or more command completion events associated with the interface device. Data indicative of the status of the interface device can then be automatically compiled in response to identifying the command completion even(s) as a result of automatically monitoring the interface device. Data indicating that the storage array has been modified can thereafter be generated if the data indicative of a status of the interface device is equivalent to a particular value. In general, the interface device can be configured as an SCSI (Small Computer Systems Interface). The data-processing system generally includes one or more logical units associated with the storage array. The data indicating that the storage array has been modified generally includes information indicative of a variation to one or more of the logical units and/or information indicative of the creation of one or more new logical units associated with the storage array.

BRIEF DESCRIPTION OF THE DRAWINGS

The accompanying figures, in which like reference numerals refer to identical or functionally similar elements throughout the separate views and which are incorporated in and form part of the specification, further illustrate embodiments of the present invention.

DETAILED DESCRIPTION OF THE INVENTION

Figure 1:
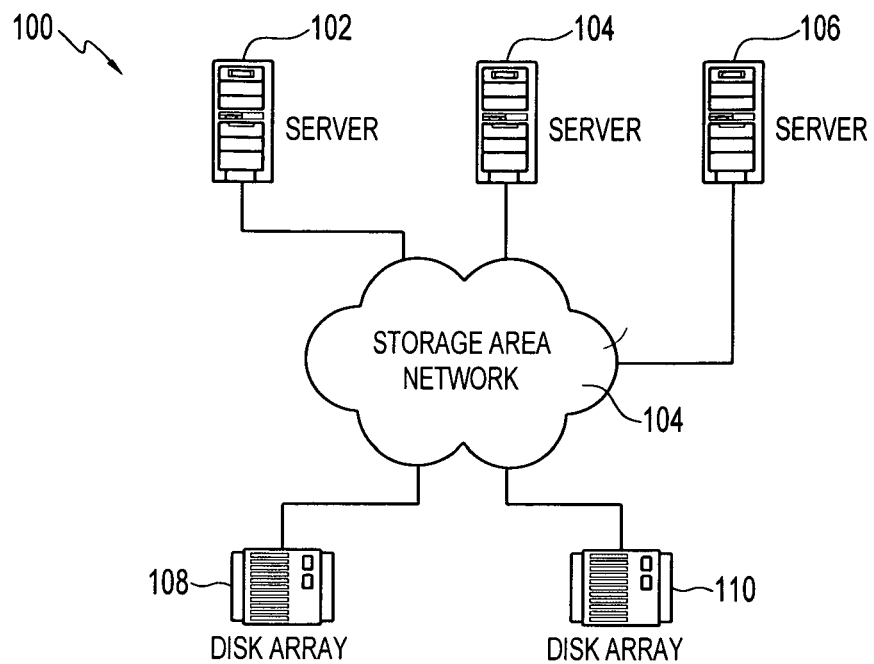
FIG. 1 illustrates a block diagram depicting an example of a storage area network system.

The particular values and configurations discussed in these non-limiting examples can be varied and are cited merely to illustrate embodiments of the present invention and are not intended to limit the scope thereof.

The embodiments disclosed herein with respect to the illustrated figures can be implemented based on SCSI primary commands. In general SCSI refers to "Small Computer Systems Interface," which is a standard connector and communications protocol used for connecting devices such as disk drives to computers. Examples of SCSI primary commands and related data, which can be adapted for use in accordance with the embodiments disclosed herein are disclosed in the document "SCSI Primary Commands—3 Project T10/1416 Revision 17", dated Jan. 28, 2005, and which can be referred to generally as SPC3.

Based on SPC3, if a logical unit inventory changes in a storage array for any reason, including removal of a logical unit or creation of a logical unit, the device server on the storage array shall generate a unit attention condition for all initiators. The device server shall set the additional sense code to REPORTED LUNS DATA HAS CHANGED. The Sense-Key/ASC/ASCQ is 06h/3Fh/0E. The unit attention will return to an initiator in the next SCSI command.

Note that the embodiments disclosed herein can be implemented in the context of a host operating system and one or more software modules. Such modules may constitute hardware modules, such as, for example, electronic components of a computer system. Such modules may also constitute software modules. In the computer programming arts, a software module can be typically implemented as a collection of routines and data structures that performs particular tasks or implements a particular abstract data type.

Software modules generally are composed of two parts. First, a software module may list the constants, data types, variable, routines and the like that can be accessed by other modules or routines. Second, a software module can be configured as an implementation, which can be private (i.e., accessible perhaps only to the module), and that contains the source code that actually implements the routines or subroutines upon which the module is based. The term module, as utilized herein can therefore refer to software modules or implementations thereof. Such modules can be utilized separately or together to form a program product that can be implemented through signal-bearing media, including transmission media and recordable media. The methodologies depicted in FIGS. 3-4 can be implemented as one or more such modules.

The embodiments disclosed herein may be executed in a variety of systems, including a variety of computers running under a number of different operating systems. The computer may be, for example, a personal computer, a network computer, a mid-range computer or a mainframe computer. In the preferred embodiment, the computer is utilized as a control point of network processor services architecture within a local-area network (LAN) or a wide-area network (WAN).

Figure 2B:
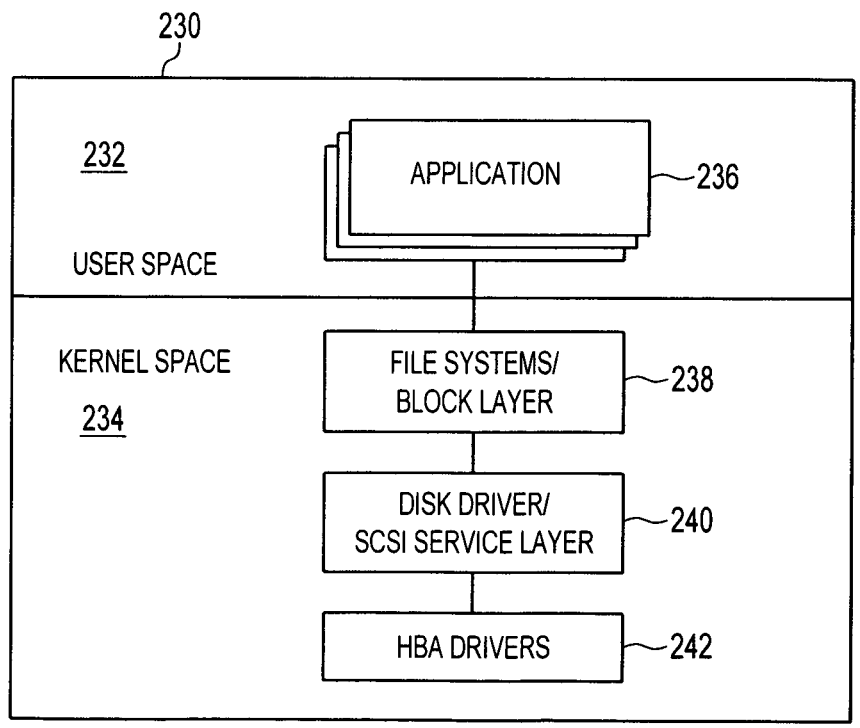
FIG. 2(b) illustrates a block diagram of a logical software driver module stack 230 in which an embodiment of the present invention can be implemented.
Figure 2A:
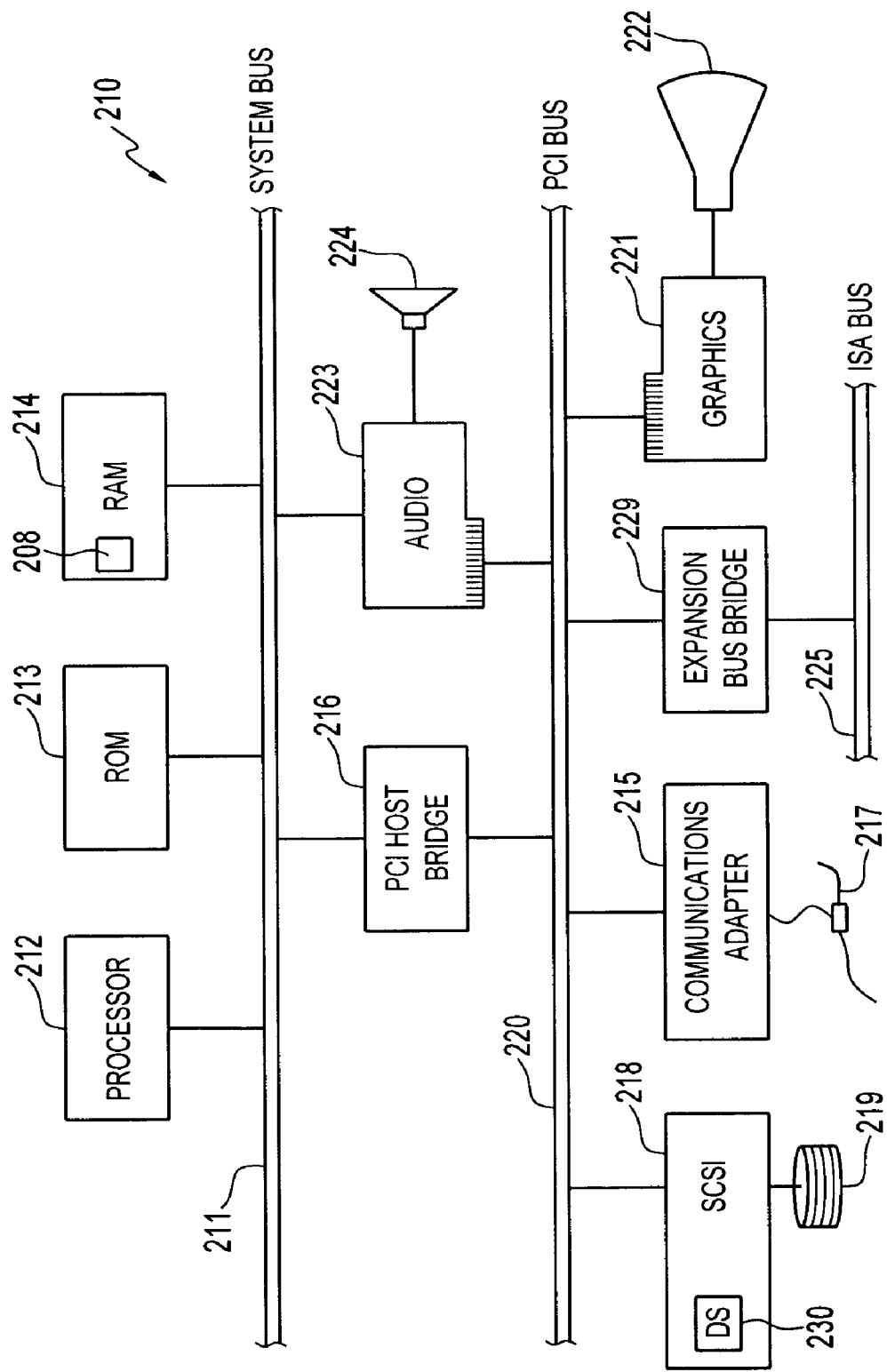
FIG. 2(A) illustrates a block diagram of a representative data-processing or computer system in which a preferred embodiment can be implemented.

Referring now to the drawings and in particular to FIG. 2(A), there is depicted a block diagram of a representative data processing or computer system 210 in which a preferred embodiment can be implemented. As shown, processor (CPU) 212, Read-Only memory (ROM) 213, and Random-Access Memory (RAM) 214 are connected to system bus 211 of computer system 210. CPU 212, ROM 213, and RAM 214 are also coupled to Peripheral Component Interconnect (PCI) local bus 220 of computer system 210 through PCI Host Bridge 216. PCI Host Bridge 216 provides a low latency path through which processor 212 may directly access PCI devices mapped anywhere within bus memory and/or input/output (I/O) address spaces. PCI Host Bridge 216 also provides a high bandwidth path for allowing PCI devices to directly access RAM 214.

Also attached to PCI local bus 220 are communications adapter 215, small computer system interface (SCSI) 218, and expansion Bus Bridge 229. Communications adapter 215 is utilized for connecting computer system 210 to a network 217. SCSI 218 is utilized to control high-speed SCSI disk drive 219. Expansion Bus Bridge 229, such as a PCI-to-ISA bus bridge, may be utilized for coupling ISA bus 225 to PCI local bus 220. In addition, audio adapter 223 is attached to PCI local bus 220 for controlling audio output through speaker 224. In alternate embodiments, additional peripheral components may be added.

Computer system 210 also preferably includes an interface such as a graphical user interface (GUI) and an operating system (OS) that reside within machine readable media to direct the operation of computer system 210. In the preferred embodiment, OS (and GUI) contains additional functional components, which permit network-processing components to be independent of the OS and/or platform. Any suitable machine-readable media may retain the GUI and OS, such as RAM 214, ROM 213, SCSI disk drive 219, and other disk and/or tape drive (e.g., magnetic diskette, magnetic tape, CD-ROM, optical disk, or other suitable storage media). Any suitable GUI and OS may direct CPU 212.

Further, computer system 210 preferably includes at least one network processor services architecture software utility (i.e., program product) that resides within machine-readable media, for example a custom defined service utility 208 within RAM 214. The software utility contains instructions (or code) that when executed on CPU 212 interacts with modified OS of the invention to execute at least one block of the functional utilities depicted in FIG. 3.

FIG. 2(b) illustrates a block diagram of a logical software driver module stack 230 in which an embodiment of the present invention can be implemented. The logical software driver module stack 230 is generally divided into a user space 232 and a kernel space 234. An application 236 functions generally in the context of user space 232, while a file systems and block layer 238 functions in kernel space 234. Additionally, a disk driver/SCSI service layer 240 functions in kernel space 234 in association with one or more HBA drivers 242. The module stack 230 depicted in FIG. 2(b) applies to almost all modern operating systems such as Windows, Linux and Unix operating systems. The disk driver/SCSI service layer 240, for example, can be adapted for use with one or more of the embodiments disclosed herein, depending upon design considerations.

Figure 3:
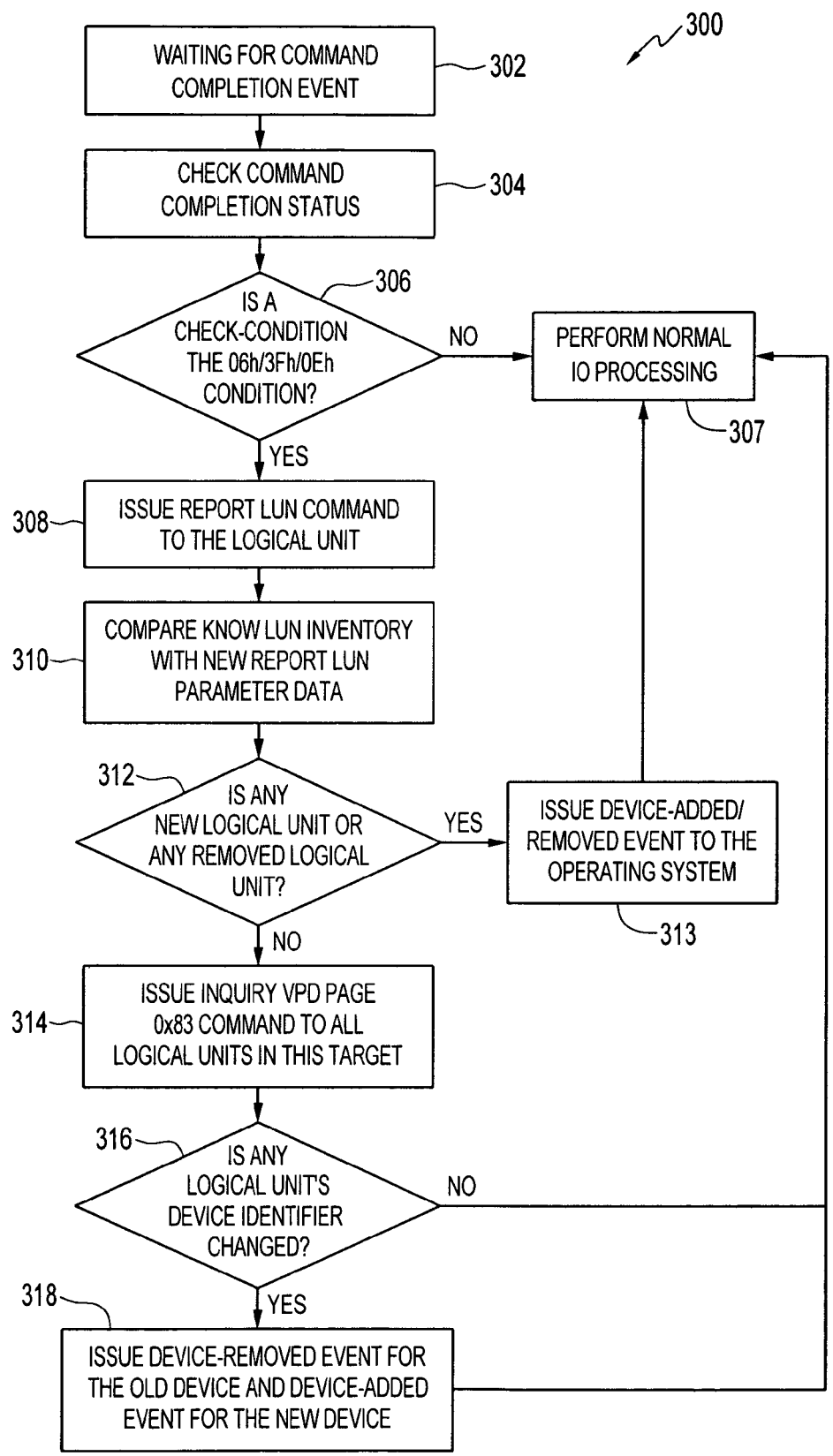
FIG. 3 illustrates a flow chart of operations depicting logical operational steps for detecting the creation-removal of a logical unit (LUN), in accordance with a preferred embodiment.

FIG. 3 illustrates a flow chart 300 of operations depicting logical operational steps for detecting the creation-removal of a. logical unit (LUN), in accordance with a preferred embodiment. The operations illustrated in flow chart 300 can be implemented in the context of a detection software module. Again, the term "software module" or "module" refers generally to a collection of routines and data structures that performs particular tasks or implements a particular abstract data type as described earlier.

Such a detection software module can be located, for example, in a driver stack (DS) 230 of an SCSI, such as, for example, SCSI 218 depicted in FIG. 2(A). Such a module can also be implemented as the custom defined utility 208 with RAM 214 depicted in FIG. 2(A), depending upon design considerations. Such a software module can therefore be stored in the driver stack of a host operating system's SCSI. Such a module possesses the ability to access a SCSI command's completion status and sense data. The software module is also configured in a manner that enables the module to access the current logical unit inventory of each connected SCSI target.

The inventory information includes a logical unit's "Device Identifier" and its operating system addressable address. Further more, the software module can generate and issue "device state changed" event to the operating system. The "device state change" event will notify the rest related software modules inside the operating system of the device state change and cause those software modules taking necessary actions. If any new logical unit or any removed logical unit is detected, the software module will generate "device state change" event and fire the event to operating system's event manager.

If the comparison doesn't show a new logical unit or removal of a logical unit, the software module will further issue SCSI INQUIRY VPD page 0×83 to each logical unit in the target to get the logical unit's "Device Identifier". A "device identifier" is a worldwide unique identifier of a logical unit. The software will compare the "device identifier" returned from VPD page 0×83 inquiry data with the known inventory data of the logical unit. The difference of device identifiers indicates the previous volume represented by the logical unit had been removed and a new volume is mapped to this logical unit. In this case, the software module will generate a "device state change" event to notify the old logical unit is removed and follow another "device state change" event to notify the new logical unit is added.

Thus, as indicated at block 302, an operation can be initiated in which the detection software module waits for a command completion event. When the command completion event is finalized, an operation can be performed, as indicated at block 304, which checks the command completion status. Thereafter, as indicated at block 306, a test can be performed to determine if a check-condition is particular value (e.g., 06/h/3Fh/0Eh) for a condition. If a match occurs, then the operation depicted at block 308 is thereafter processed. If not, then normal input/output (I/O) processing operations are implemented at indicated at block 307.

In the operation described at block 308, however, a REPORT LUN command can be issued to a particular logic unit. Thereafter, as illustrated at block 310, a known LUN inventory can be compared with the resulting new REPORT LUN parameter data. Next, as indicated at block 312, a test can be performed to determine if any new logical unit or any removed logical unit is available. If so, then the operation depicted at block 313 is processed in which a device added/removed command is issued to the operation system. Following processing of the operation described at block 313, the operation depicted at block 307 can then be processed in which normal I/O processing operations are implemented.

Assuming a negative response results from the testing operation described at block 312, an INQUIRY_VPD page 0×83 commands as described earlier can be issued to all logical units within this target. Following processing of the operation described at block 314, an additional test can be performed as indicated at block 316. The operation illustrated at block 316 determines whether any logical unit's device identifiers have changed. If not, then the operation depicted at block 307 is then processed. If so, then the operation described at block 318 is processed-in which the device-removed event is issued for the old device and the device-added event issued for the new device. The operation then described at block 307 can thereafter be processed.

Figure 4:
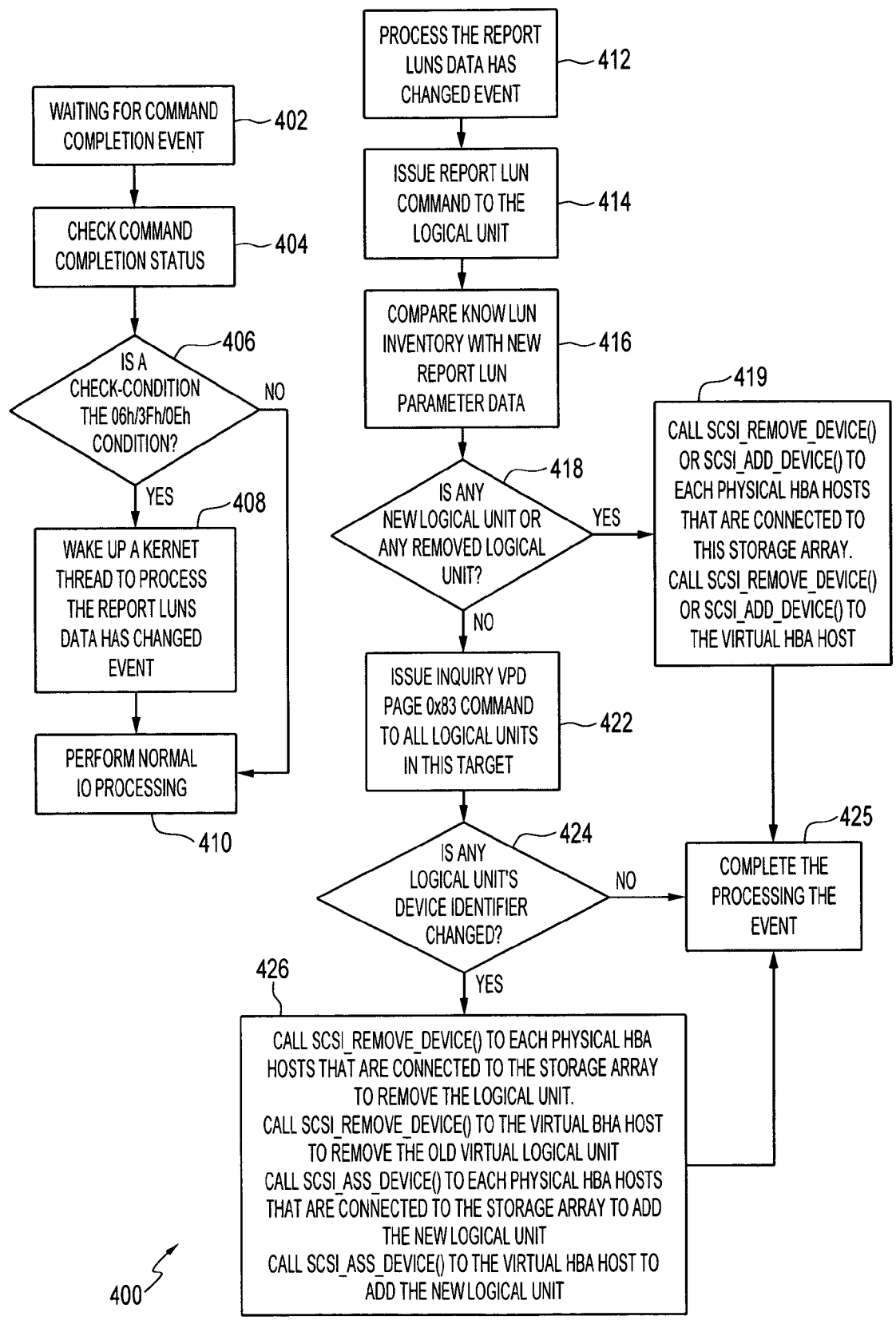
FIG. 4 illustrates a flow chart of operations depicting logical operation steps that can be implemented for the detecting the creation and/or deletion of a logical unit (LUN), in accordance with an alternative embodiment.

FIG. 4 illustrates a flow chart 400 of operations depicting logical operation steps that can be implemented for the detecting the creation and/or deletion of a logical unit (LUN), in accordance with an alternative embodiment. The operations illustrated in flow chart 400 can be implemented in the context of a detection software module. Again, the term "software module" or "module" refers generally to a collection of routines and data structures that performs particular tasks or implements a particular abstract data type as described earlier. Note that flow chart 300 generally describes procedure for detecting the creation/deletion of a Logical Unit utilizing Linux MPP driver architecture.

The use of Linux MPP driver architecture is not considered a limiting feature of the embodiments but is referred to herein for general edification and exemplary purposes only. In general, Linux is a free Unix-type operating system originally created by Linus Torvalds with the assistance of developers around the world. Developed under the GNU General Public License, the source code for Linux is freely available to users. MPP is an acronym that refers to MultiPathing Proxy, which is described in greater detail herein with respect to FIG. 5.

As indicated at block 402, an operation is processed in which a command completion event waits to be completed. Thereafter, as depicted at block 404, a check of the command completion status operation is processed. Thereafter, a test can be performed, as indicated at block 406, to determine if the check-condition matches a particular condition value. If so, then the operation depicted at block 408 is processed, in which a kernel thread is alerted in order to indicate that a "REPORT LUNS DATA HAS CHANGED" event has occurred. If the answer to the test depicted at block 406 is negative, then the operation depicted at block 410 is processed following the operation illustrated at block 406. Similarly, following processing of the operation illustrated at block 408, the operation depicted at block 410 is processed.

Following processing of the operations depicted at blocks 402, 404, 406, 408, 410, the operations depicted beginning with block 412 can be processed. As indicated at block 412, the "REPORT LUNS DATA HAS CHANGED" event can be processed followed thereafter by the operation depicted at block 414 in which a REPORT LUN command is issued to a logical unit. Next, as depicted at block 416, a known LUN inventory can be compared with the new REPORT LUN parameter data. Thereafter as illustrated at block 418, a test can be performed to determine if any new logical units or any removed logical units are identified. If so, then the operation described at block 419 can be processed. If not, then the operation illustrated at block 412 is processed. In the operations depicted at block 419, an "scsi_remove_device( )" or "scsi_add_device( )" can be called to each physical HBA host that is connected to the storage array. The "scsi_remove_device( )" or "scsi_add_device" can be called to a virtual HBA host.

Following processing of the operation depicted at block 422, a test can be performed to determine if any logical unit's device identifier has changed. If not, then the operation described at block 425 can be processed in which processing of the event is completed. Note that the operation depicted at block 425 can also be processed following completion of the operation illustrated at block 419. If the answer to the test described at block 424 is "YES" then the operation described at block 426 can be processed. As indicated at block 426, an "scsi_remove_device( )" can be called to each physical HBA hosts that are connected to the storage array in order to remove the logical unit. Additionally, the "scsi_remove_device( )" can be called to the virtual HBA host to remove the old virtual logical unit. Also, as indicated at block 426, an "scsi_add_device( )" can be called to each physical HBA host connected to the storage array in order to add the new logical unit. Finally, the "scsi_add_device( )" can be called to the virtual HBA host to add the new logical unit. Following processing of the operations depicted at block 426, the operation depicted at block 425 can then be processed.

Figure 5:
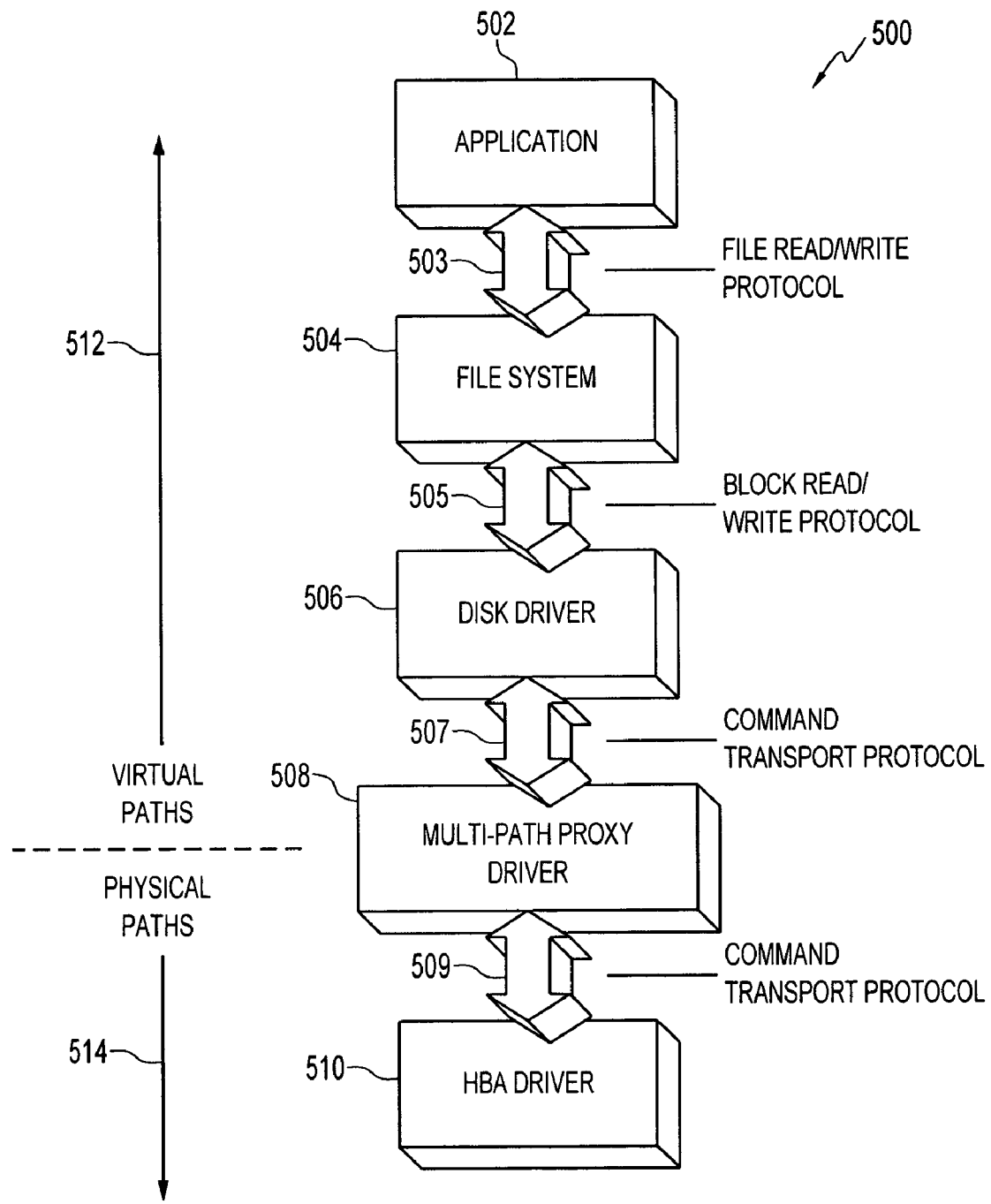
FIG. 5 illustrates a block diagram of an MPP (MultiPathing Proxy) architecture, which can be adapted for use in accordance with one or more embodiments.

FIG. 5 illustrates a block diagram of an MPP (MultiPathing Proxy) architecture 500, which can be adapted for use in accordance with one or more embodiments. MPP architecture 500 is a multiple path driver architecture that includes an application 502, which communicates with a file system 504 via a file read/write protocol 503. File system 504 in turn can communicate with a disk driver 506 via a block read/write protocol 505. Disk driver 506 communicates generally with an MPP driver 508 via a command transport protocol 507. The MPP driver 508 in turn can communicate with an HBA driver 510 via a command transport protocol 509. Note that in FIG. 5 a virtual path 512 is identified with respect to a physical path 514. In the architecture 500, a driver module is inserted between the physical HBA (host-bus-adapter) driver 510 and an SCSI service driver module. The HBA driver 510 routes IO requests from the top layer driver modules to the HBA driver 510.

It is important to note that, although the present invention has been described in the context of a fully functional computer system, those skilled in the art will appreciate that the mechanisms of the present invention are capable of being distributed as a program product in a variety of forms, and that the present invention applies equally regardless of the particular type of signal-bearing media utilized to actually carry out the distribution. Examples of signal bearing media include, but are not limited to, recordable-type media such as floppy disks or CD ROMs and transmission-type media such as analogue or digital communications links.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method in a data-processing system for automatically identifying storage array modifications thereof, comprising:
    automatically monitoring an interface device associated with said data-processing system and a storage array thereof in order to identify at least one command completion event associated with said interface device;
    performing a test to determine if a check condition value is a particular value after said at least one command completion event is finalized;
    compiling data indicative of a status of said interface device if said check condition value is said particular value wherein said particular value is a 06h/3Fh/0Eh condition by comparing a known logical unit inventory associated with said storage array with a new logical unit parameter data generated thereof, in response to identifying said at least one command completion event as a result of automatically monitoring said interface device; and
    generating data indicating that said storage array has been modified and issuing a device state change event to an operating system associated with said data-processing system, if said data indicative of said status of said interface device is equivalent to a particular value, in order that said storage array modifications are thereby usable.

2. The method of claim 1 wherein said interface device comprises an SCSI.

3. The method of claim 1 wherein said data-processing system comprises at least one logical unit associated with said storage array.

4. The method of claim 3 wherein said data indicating that said storage array has been modified comprises information indicative of a variation to said at least one logical unit.

5. The method of claim 3 wherein said data indicating that said storage array has been modified comprises information indicative of a creation of at least one new logical unit associated with said storage array.

6. The method of claim 1 further comprising utilizing an MPP architecture for at least one of the following:
    automatically monitoring said interface device associated with said data-processing system and said storage array thereof in order to identify said at least one command completion event associated with said interface device;
    compiling data indicative of a status of said interface device, in response to identifying said at least one command completion event as a result of automatically monitoring said interface device; and
    generating data indicating that said storage array has been modified, if said data indicative of said status of said interface device is equivalent to said particular value.

7. The method of claim 6 wherein said MPP architecture comprises a Linux MPP architecture.

8. A data-processing system for automatically identifying storage array modifications thereof, comprising:
    an interface device associated with a data-processing system and a storage array thereof, wherein said interface device is automatically monitored in order to identify at least one command completion event associated with said interface device by performing a test to determine if a check condition value is a particular value after said at least one command completion event is finalized;
    a module for compiling data indicative of a status of said interface device if said check condition value is said particular value wherein said particular value is a 06h/3Fh/0Eh condition by comparing a known logical unit inventory associated with said storage array with a new logical unit parameter data generated thereof, in response to identifying said at least one command completion event as a result of automatically monitoring said interface device; and
    a module for generating data indicating that said storage array has been modified and issuing a device state change event to an operating system of said data-processing system, if said data indicative of said status of said interface device is equivalent to a particular value, wherein said data indicating that said storage array has been modified comprises information indicative of a creation of at least one new logical unit associated with said storage array in order that said storage array modifications are thereby usable.

9. The system of claim 8 wherein said interface device comprises an SCSI.

10. The system of claim 8 wherein said data-processing system comprises at least one logical unit associated with said storage array.

11. The system of claim 10 wherein said data indicating that said storage array has been modified comprises information indicative of a variation to said at least one logical unit.

12. The system of claim 10 wherein said interface device comprises an SCSI.

13. The system of claim 10 further comprising an MPP architecture utilized to implement at least one of the following:
    said interface device associated with said data-processing system and said storage array thereof, wherein said interface device is automatically monitored in order to identify said at least one command completion event associated with said interface device;
    said module for compiling data indicative of said status of said interface device, in response to identifying said at least one command completion event as a result of automatically monitoring said interface device; and
    said module for generating data indicating that said storage array has been modified, if said data indicative of said status of said interface device is equivalent to said particular value.

14. The system of claim 13 wherein said MPP architecture comprises a Linux MPP architecture.

15. A program product residing in a data-processing system for automatically identifying storage array modifications thereof, comprising:

instruction media residing in a memory of said data processing system for automatically monitoring an interface device associated with said data processing and a storage array thereof in order to identify at least one command completion event associated with said interface device;

instruction media residing in a memory of said data processing system for automatically performing a test to determine if a check condition value is a particular value after said at least one command completion event is finalized;

instruction media residing in a memory of said data processing system for compiling data indicative of a status of said interface device if said check condition value is said particular value wherein said particular value is a 06h/3Fh/0Eh condition by comparing a known logical unit inventory associated with said storage array with a new logical unit parameter data generated thereof, in response to identifying said at least one command completion event as a result of automatically monitoring said interface device; and instruction media residing in a memory of said data processing system for generating data indicating that said storage array has been modified and issuing a device state change event to an operating system of said data-processing system, if said data indicative of said status of said interface device is equivalent to a particular value, in order that said storage array modifications are thereby usable.

16. The program product of claim 15 wherein said interface device comprises an SCSI.

17. The program product of claim 15 wherein said data-processing system comprises at least one logical unit associated with said storage array.

18. The program product of claim 17 wherein said data indicating that said storage array has been modified comprises information indicative of a variation to said at least one logical unit.

19. The program product of claim 17 wherein said data indicating that said storage array has been modified comprises information indicative of a creation of at least one new logical unit associated with said storage array.

20. The program product of claim 15 wherein each of said instruction modules further comprises signal-bearing media comprising recordable media.

* * * * *